3,659,002
ULTRAVIOLET LIGHT STABILIZATION OF POLYOLEFINS WITH NICKEL OR COBALT COMPLEXES
Ronald D. Mathis, Bartlesville, Okla., and Howard E. Dunn, Mount Vernon, Ind., assignors to Phillips Petroleum Company
No Drawing. Filed Jan. 22, 1970, Ser. No. 5,103
Int. Cl. C08f 45/60, 45/62
U.S. Cl. 260—45.75 N                10 Claims

ABSTRACT OF THE DISCLOSURE

Solid homopolymer or copolymers prepared from 1-olefins containing from about 2 to 6 carbon atoms per molecule are protected against the deteriorating effects of ultraviolet light by incorporating therein minor amounts of a compound selected from (a) 2,2'-dipyridyl cobalt dihalide complex compounds, (b) a nickel complex formed by the reaction of borontrifluoride with bis(dimethylglyoxime-N,N')nickel and (c) a nickel complex represented by the following formula:

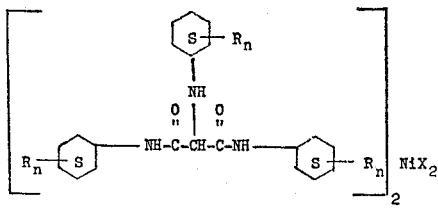

wherein X is a halogen, R is an alkyl group containing up to about 24 carbon atoms and $n$ is an integer having a value of 0, 1, or 2.

---

This invention relates to a stabilized polyloefin composition that is protected against the deteriorating effects of ultraviolet light. This invention further relates to a process for stabilizing homopolymers or copolymers prepared from 1-olefins containing from about 2 to 6 carbon atoms per molecule against the deteriorating effects of ultraviolet light.

The importance of protecting polyolefin polymers against the degradative action of sunlight is well known. Numerous additives have been found to be effective, to varying degrees, for certain polymer compositions to provide this protection. While certain complexed nickel and cobalt compounds have heretofore been found to be useful for this purpose, the nickel and cobalt complexes as a class have not been found generally suitable. For example, the incorporation of some nickel or cobalt complex compounds into polymers has actually reduced the ultraviolet stability to a level which is well below that of the untreated polymer product. Also, some of these complexes are unstable at elevated temperatures and tend to loose their effectiveness when the polymer containing them is heated during its processing steps.

It has now been found that the particular additives of this invention are surprisingly effective in minor amounts to stabilize polymers prepared from 1-olefins having from about 2 to 6 carbon atoms per molecule. Also, the particular additives of this invention, when incorporated into said polyolefins, are very effective for protection against the deteriorating effects of ultraviolet light and are themselves essentially stable at elevated temperatures and thus can be employed in polymer processing steps that require elevated temperatures.

The particular additives of this invention are selected from the group consisting of (a) 2,2'-dipyridylcobalt dihalide complex represented by the following formula:

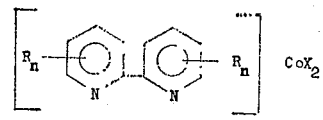

wherein R is in an alkyl group containing from about 1 to about 24, preferably from about 8 to 24 carbon atoms per molecule, wherein $n$ is an integer having the value of 0, 1, or 2, and wherein X is a halogen selected from fluorine, chlorine, bromine, or iodine, preferably bromine, or chlorine, (b) the complex compound, formed by the reaition of borontrifluoride with bis(dimethylglyoxime-N,N')nickel, represented by the following formula:

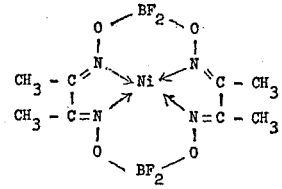

and, (c) and organoamidonickel complex represented by the following formula:

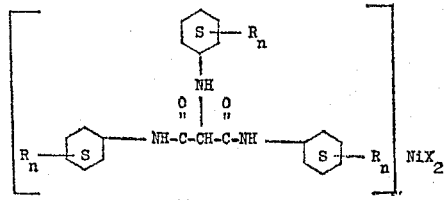

wherein R, X, and $n$ are as previously defined.

The 2,2'-dipyridylcobalt complex representing additive (a) of this invention can be prepared simply by combining under conventional reaction conditions a cobalt salt and a dipyridine compound. The additive of this invention represented by formula (b) can be prepared simply by combining borontrifluoride with the dimethylglyoxime nickel complex under conventional reaction conditions. The additive of this invention represented by formula (c) is disclosed in U.S. patent application Ser. No. 864,-564, filed Oct. 7, 1969, by Howard E. Dunn, entitled Amide-Nickel Salt Complexes Used as Olefin Oligomerization Catalysts.

Some specific examples of additive (a) are:

(2,2'-dipyridine)dibromocobalt
(4,4'-dioctyl-2,2'-dipyridine)dichlorocobalt
(2,2'-dipyridine)difluorocobalt
(5-dodecyl-2,2'-dipyridine)diiodocobalt
(4,4',5,5'-tetratetracosyl-2,2'-dipyridine)dichlorocobalt
(5,5'-dioctadecyl-2,2'-dipyridine)dibromocobalt and the like, and mixtures thereof.

Some specific examples of additive (c) are:

bis[N,N'-dicyclohexyl-2-(cyclohexylamino)malonamide] dichloronickel
bis[N,N'-di(3-octylcyclohexyl)-2-(cyclohexylamino) malonamide]dichloronickel
bis[N,N'-di(4-dodecylcyclohexyl)-2-(4-dodecylcyclohexylamino)malonamide]dibromonickel
bis[N,N'-di(4,4',5,5'-tetradecylcyclohexyl)-2-(cyclohexylamino)malonamide]diiodonickel bis[N,N'-di(4,4'-ditetracosylcyclohexyl)-2-(4,4'-ditetracosylcyclohexylamino)malonamide]difluoronickel
bis[N,N'-dicyclohexyl-2-(cyclohexylamino)malonamide]dibromonickel
and the like and mixtures thereof.

The polymers which are applicable for stabilization in accordance with the present invention are those 1-olefin polymers prepared from olefins having from about 2 to 6 carbon atoms per molecule. These olefins may be prepared in any conventional method known such as U.S. Pat. 2,825,721, issued to Hogan et al., Mar. 4, 1958. Propylene is conveniently polymerized by contact with a catalyst system comprising $TiCl_3 \cdot \frac{1}{3} AlCl_3$ and an organoaluminum compound such as diethylaluminum chloride. The polymers employed according to this invention can be homopolymers such as polyethylene or polypropylene or they may be copolymers of two or more such olefins. They also may include blends of polyolefins with other polymers such as polystyrene, polyvinyl chlorides, polyvinyl acetates, polyamides, etc., or mixtures thereof. Diolefins such as butadiene and isoprene can also be suitably employed. The presently preferred polymer is polypropylene.

The additives of this invention can be employed singularly or in admixture with one another but they should be employed in amounts sufficient to provide from about 0.1 to about 5, preferably from about 0.5 to 2, parts by weight of additive per 100 parts by weight of polymer. The quantity of the additives can vary over a wide range depending upon the specific product fabricated from the polymer. Of course, the polymer can contain other conventional additives such as antioxidants, processing aids, pigments, and the like.

The additives of this invention can be incorporated into the polymer substrate by using conventional techniques such as blending on a roll mill, in an internal mixer such as a Banbury mixer, or in a screw extruder, and the like.

Generally, the additives of this invention, along with any other conventional additives, can be dry blended and then the total mixture incorporated into the polymer at temperatures preferably above the melting point of said polymer to insure proper admixture of the additives.

Illustrative of the foregoing discussion and not to be interpreted as a limitation on the scope thereof, or on the ingredients herein employed, the following examples are presented.

EXAMPLE I

The dipyridylcobalt complex, (2,2'-dipyridine)dibromocobalt, was blended with polypropylene in an amount to provide 0.5 part by weight of additive per 100 parts by weight of polymer. Commercial stabilizer, Irganox 1093 (di-n-octadecyl 3,5-di-tert-butyl-4-hydroxybenzylphosphonate) was also blended with said polypropylene to provide 0.1 part by weight of Irganox 1093 per 100 parts by weight of polymer. After dry blending the additives with the polypropylene the blend was masticated in a Brabender Plastograph at 200° C. for 5 minutes under a nitrogen atmosphere. This polymeric composition was then cooled and formed into 5 mil films by compression molding. Triplicate samples were then exposed on a 20 hours on-4 hours off schedule, in a commercial blacklight-sunlight exposure device manufactured by The American Ultraviolet Company. The samples were tested for failure every 20 hours of exposure by flexing each test strip in a rolling motion such that the strip is subjected throughout its length to about 180° bend. Failure was cracking of the specimen. For purposes of control, film strips were also prepared as herein stated except that the additive of this invention was omitted. They were exposed to identical light conditions and their failure determined in the same manner. The three control runs had an average time until failure of 140 hours while the polypropylene stabilized according to this invention had an average time until failure of 226.7 hours. These results clearly demonstrate that the additive of this invention greatly improves the ultraviolet resistance of polypropylene. The polypropylene employed in Example I was a solid polypropylene having a melt flow of about 3.

EXAMPLE II

The nickel complex (additive (b)) of this invention represented by the following formula:

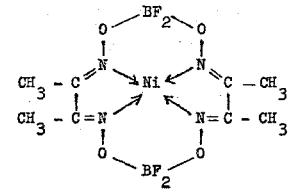

was employed using the same testing procedure as employed in Example I to demonstrate its stabilizing abilities. Comparative testing samples were also prepared with a commercial UV stabilizer, Ferro AM-101, bis[2,2'-thiobis[4-(1,1,3,3-tetramethylbutyl)phenol]]nickel, at the same additive level, i.e., 0.5 php. together with 0.1 php. of Irganox 1093. A control sample as in Example I did not contain either the Ferro AM-101 nor said additive B of this invention. The testing strips were similarly prepared and tested with the blacklight-sunlight exposure device as in Example I. The average hours to failure of the control strips which did not contain the stabilizer of this invention nor the commercial Ferro AM-101 was 140 hours. Average hours to failure of control strips employing a commercial additive, i.e. AM-101 was 167. The average hours to failure of the composition prepared according to this invention was 246.

These results clearly demonstrate that this additive of the present invention greatly extends the ultraviolet resistance of polypropylene.

EXAMPLE III

The nickel complex (additive (c) of this invention), bis[N,N'-dicyclohexyl-2-(cyclohexylamino)malonamide]dichloronickel was employed under identical testing procedures as employed in Examples I and II. The average hours to failure of the control strips which were identical to those of the invention composition except they did not contain the ultraviolet stabilizer of this invention was 133 hours. The average hours to failure of the composition prepared according to this invention was 220 hours.

These runs clearly demonstrate that the nickel complex (additive (c)) of this invention greatly extended the ultraviolet resistance of polypropylene.

As will be evident to those skilled in the art, various modifications of this invention can be made or followed in light of the discussion and disclosure herein set forth without departing from the scope or the spirit thereof.

We claim:
1. A composition of matter stabilized against the degrading effects of ultraviolet light comprising homopolymers or copolymers derived from 1-olefins containing from about 2 to 6 carbon atoms per molecule; a suitable antioxidant; and at least one ultraviolet light stabilizing compound selected from
   (a) a 2,2'-dipyridylcobalt complex represented by the following formula:

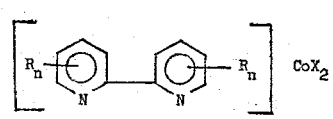

(b) the compound represented by the following formula:

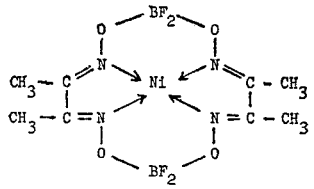

or (c) an organoamidonickel complex represented by the following formula:

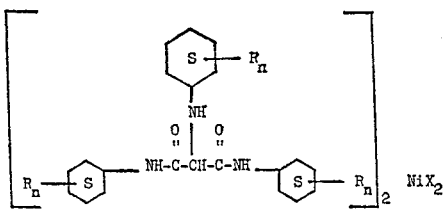

wherein R is an alkyl group containing from about 1 to 24 carbon atoms per molecule, wherein $n$ is an integer having the value of 0, 1, or 2, and X is halogen selected from fluorine, chlorine, bromine, or iodine, and wherein said stabilizing compound is employed in an amount sufficient to provide from 0.1 to about 5 parts by weight of said compound per 100 parts by weight of polymer prepared from said 1-olefin.

2. A composition in accord with claim 1 wherein said ultraviolet light stabilizing compound is 2,2'-dipyridinedibromocobalt, which is present in an amount in the range of from about 0.5 to about 2 parts by weight per 100 parts by weight of homopolymer or copolymer.

3. A composition in accord with claim 1 wherein said ultraviolet light stabilizing compound is a compound represented by the formula:

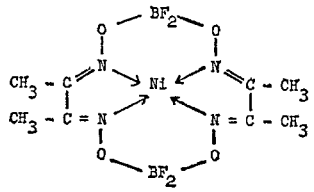

which is present in an amount in the range of from about 0.5 to about 2 parts by weight per 100 parts by weight of homopolymer or copolymer.

4. A composition in accord with claim 1 wherein said ultraviolet light stabilizing compound is bis dichloronickel which is present in an amount in the range of from about 0.5 to 2 parts by weight per 100 parts by weight of homopolymer or copolymer.

5. A composition in accord with claim 2 wherein the 1-olefin is propylene.

6. A polymeric composition in accord with claim 3 wherein the 1-olefin is propylene.

7. A polymeric composition in accord with claim 4 wherein the 1-olefin is propylene.

8. A composition in accord with claim 2 wherein said antioxidant is di-n-octyldecyl 3,5-di-tert-butyl-4-hydroxybenzylphosphonate.

9. A composition in accord with claim 3 wherein said antioxidant is di-n-octyldecyl 3,5-di-tert-butyl-4-hydroxybenzylphosphonate.

10. A composition in accord with claim 4 wherein said antioxidant is di-n-octyldecyl 3,5-di-tert-butyl-4-hydroxybenzylphosphonate.

References Cited
UNITED STATES PATENTS

| | | | |
|---|---|---|---|
| 2,578,910 | 12/1951 | Uraneck | 260—270 |
| 3,261,790 | 7/1966 | Hecker | 260—45.75 |
| 3,367,870 | 2/1968 | Spivack | 260—953 |
| 3,148,936 | 9/1964 | Turbak | 260—45.75 |

OTHER REFERENCES

Chemical Abstracts, vol. 65 (1966), section 13894h.

MAURICE J. WELSH, Primary Examiner

V. P. HOKE, Assistant Examiner

U.S. Cl. X.R.

260—45.75 R, 94.9 B

UNITED STATES PATENT OFFICE
CERTIFICATE OF CORRECTION

Patent No. 3,659,002                      Dated April 25, 1972

It is certified that error appears in the above-identified patent and that said Letters Patent are hereby corrected as shown below:

Column 6, line 5, "bis dichloronickel" should read --- bis[N,N'-dicyclohexyl-2-(cyclohexylamino)malonamide]dichloronickel ---.

Signed and sealed this 18th day of December 1973.

(SEAL)
Attest:

EDWARD M. FLETCHER, JR.          RENE D. TEGTMEYER
Attesting Officer                   Acting Commissioner of Patents